United States Patent Office 3,629,392
Patented Dec. 21, 1971

3,629,392
ENTRAPMENT COMPOSITIONS AND PROCESSES
Gilbert S. Banker, School of Pharmacy, Purdue University, Lafayette, Ind. 47907, and Harris Goodman, 3 Beauregard Terrace, Congers, N.Y. 10920
No Drawing. Continuation-in-part of abandoned application Ser. No. 757,143, Sept. 3, 1968. This application Aug. 15, 1969, Ser. No. 850,663
Int. Cl. A61k 27/12
U.S. Cl. 424—22
14 Claims

ABSTRACT OF THE DISCLOSURE

Pharmaceutical compositions are prepared by combining in the presence of water a polymer having acidic or basic functionality with a pharmaceutically active material having respectively basic or acidic functionality, coagulating or otherwise separating the product produced and then formulating the product by conventional techniques into suitable dosage forms. The resulting products are characterized by possessing unique sustained release, enteric or delayed release properties.

---

This application is a continuation-in-part of pending application Ser. No. 757,143, filed Sept. 3, 1968.

This invention relates to polymer emulsion compositions and is more particularly related to new and improved pharmaceutical compositions having controlled release including, but not limited to, sustained release, enteric or delayed release properties and to methods of preparation of these compositions. By controlled release the rate of dissolution and availability of the drug may be regulated so that the quantity of drug which is released at a particular time or a particular site is enhanced.

Heretofore, a variety of techniques have been used to provide protective coverings for drugs so as to impart sustained release or controlled release or to make oral administration more palatable or even feasible. These prior art pharmaceutical preparation methods include encapsulating the drug, coating granules or tablets of drugs with films of suitable materials, combining the drug with an ion exchange resin, chemically combining a basic drug in an acidic polymer gel or physically entrapping the drug in a polymer matrix. The very variety of available processes itself illustrates both the range of problems posed in formulating pharmaceutically active materials and the need for improved processes offering greater control, flexibility and economy.

Many drugs used in oral preparations, such as syrups or suspensions, tablets or capsules, are absorbed too rapidly or in an uncontrolled manner in the human system and the administration thereof is made difficult, toxic or potentially more dangerous than is necessary. The incidence of undesirable side effects such as nausea, dizziness, visual disturbances or profuse sweating accompany many drugs, particularly when rapid adsorption produces high peak blood levels which touch the toxic range. Moreover, with oral preparations, some drugs produce a bitter taste or numbing of the tongue and surrounding mucous membranes. These side effects make these prior art oral pharmaceutical preparations very unpalatable, unpleasant, occasionally toxic and more hazardous than necessary. By inhibiting release or by providing gradual release of the drug at absorption sites, (a) undesirable peaking of blood levels is reduced and drug safety may be improved, (b) drug dissolution may be retarded until the drug has passed sites of high acidity where the drug is more prone to decomposition, (c) drug release may be retarded to avoid irritation in the stomach, or an emetic effect due to drug dissolution in the stomach, or (d) drug release may be delayed to make the drug available at desirable sites of absorption at a high drug concentration for improved absorption.

By employment of the present invention the aforementioned problems and difficulties of the prior art, among others, are substantially overcome by the provision of new and improved methods. Compositions prepared by the methods of the invention may have sustained, enteric, delayed or controlled release properties. The methods and compositions of the present invention, in production, are markedly less expensive than the methods and compositions of the prior art; the necessity for expensive coating apparatus and skilled coating personnel is eliminated, and the adaptability of the methods of the present invention permit their application to all classes of drugs characterized by a basic or acidic group in the drug moiety as described in more detail hereinafter.

The methods and compositions of the present invention have a further advantage in that they are also adaptable to produce enteric, delayed release, sustained release or controlled release pharmaceutical compositions, in either solid or liquid preparation dosage form, which have been found, in some instances, to be more stable than standard organic or inorganic salts of the same drugs when these compositions are prepared with the conventional drug salts.

The novel methods of the present invention result, not only in compositions which can be employed in liquid sustained or controlled release form, but may also result in pharmaceutical products having slower absorption rates and which in oral dosage form are practically free of any bitter taste or numbing effects. The methods of the present invention are uniquely suitable in preparing accurate dosage units of highly potent drugs.

These and other objects, features and advantages of the present invention will become readily apparent from a careful consideration of the following detailed description and illustrative examples.

GENERAL DISCUSSION

In the process of the invention an aqueous latex of a polymer having acidic and/or basic groups is contacted with a pharmaceutically active material (hereinafter called a "drug") having basic and/or acidic groups. In a preferred embodiment, the water is then removed and the product formulated into a suitable dosage form. It is believed that the drug molecules are chemically or physicochemically bonded to the polymer chains. In addition, the extremely high surface area presented by the polymer due to the colloidal size of the polymer particles is believed to result in adsorption of drug molecules on the surface of the polymer particles.

As stated, the polymers used in the invention are in an aqueous latex. By "latex" is meant an aqueous dispersion of colloidal or near colloidal polymer particles. Conventionally a polymer latex is produced by emulsion polymerization and will have particle sizes in the micron and submicron range. Minor amounts of organic liquids, such as lower alkanols, which do not interfere with the polymer-drug reaction may be present during the reaction. If the polymer contains both basic and acidic groups, it may be used to react with basic drugs or acidic drugs. However, where the polymer contains only acidic groups, the drug must contain basic groups for chemisorption to occur although limited physical adsorption may exist. Similarly, where the polymer is basic, the drug must be acidic; if the drug is both acidic and basic, the polymer may be either basic or acidic.

As an additional means of controlling drug release, drugs either may be entrapped in the presence of a soluble diluent component, or the soluble diluent may be added later in milling the dry polymer-drug product with the soluble component serving to facilitate and accelerate subsequent drug dissolution release. Suitable excipients include, for example, mannitol, lactose, urea, sorbitol, polyoxyethylene glycols, sodium chloride, etc.

The methods of the invention are highly reproducible, stoichiometric techniques for drug entrapment in which the level of entrapment, as well as the uniformity and degree of drug dispersion, may approach or may equal molecular or ionic scale.

POLYMERS

The polymers useful in the present invention are widely available commercially. Generally, these polymers are produced by conventional emulsion polymerization and contain one or more monomers having either basic or acidic groups. Suitable acidic groups include for example carboxylate, sulfonate, and phosphonate. Suitable monomers embodying these acidic radicals include acrylic acid, methacrylic acid, crotonic acid, itaconic acid, maleic acid, half-esters of maleic acid, maleic anhydride, sulfonated styrene, phosphonated styrene, etc. Suitable monomers containing basic functionality include for example polyvinyl amine, the aminoalkyl esters of any of the aforesaid acids such as aminoethyl methacrylate, etc. These monomers are copolymerized with any other copolymerizable monomer so long as the resulting polymer does not produce any adverse physiological reaction. Polymers useful in the invention include for example those produced by copolymerizing one or more of the above acidic or basic monomers with vinyl acetate, vinyl propionate, vinyl ethers, hydroxyethyl methacrylate, acrylonitrile, ethylene, styrene, vinyl chloride and one or more alkyl acrylate or methacrylate monomers.

The maximum amount of acid in the copolymer is determined by the solubility characteristics of the overall copolymer composition, i.e., above a certain acid level it is not possible to form a latex. This level varies with the nature of the acid and of the other monomers. Thus, methacrylic acid could be present in up to about 75% by weight when copolymerized with other monomers of median hydrophobic properties such as the lower alkyl esters of acrylic and methacrylic acid, while slightly more acid could be used if the other monomers were strongly hydrophobic, such as styrene. Conversely, the maximum acid level would be lower for acids which are more strongly hydrophilic than methacrylic acid, such as maleic acid, acrylic acid, etc. The presence of non-ionic hydrophilic groups, such as ether linkages, hydroxy groups, etc., will also act to lower the maximum acid level.

The minimum acid level in the copolymer is determined both by the ability of the polymer to entrap a reasonable amount of drug and by the ability of the polymer to be hydrated, e.g., swelled or even dissolved, by digestive fluids either in the stomach (acid pH) or the small intestine (slightly basic pH). The swelling need not be great. The polymer contains sufficient acid content if a dried powder produced from the polymer approximately doubles in size in stomach or intestinal fluid at 37° C. This action assists the dispersion of the drug making it available to the body more readily than would be the case if the polymer were inert to the digestive fluid. This is important in the polymer-drug products of the invention due to the molecular scale of entrapment as opposed to the channels of drug created when dry polymer and drug are mixed and tabletted. Again the minimum amount of acid will vary with the nature of the acid and of the other monomers. Thus, for copolymers of methacrylic acid with monomers of median hydrophobic properties as defined above, about 10% acid is suitably present. More hydrophobic comonomers would require a higher acid content, while more hydrophilic comonomers (such as non-ionic solubilizing groups) or more hydrophilic acids (acrylic, maleic, etc.) would permit the use of lower acid contents.

The latices found useful in the practice of the present invention are polymer products made by an emulsion process which are colloidal dispersions of polymer, and are usually marketed as 20 to 60% solid dispersions, by weight. The latices of dispersed colloid of the polymer emulsions useful in the practice of the present invention present a highly concentrated dispersed polymer system of high molecular weight material, which is impossible to match in high concentration in solution due to solubility and viscosity limitations. For example, it has been estimated that such a typical polymer emulsion contains in the order of $10^{14}$ or 100 trillion polymer particles per cubic centimeter of dispersion.

Because of their ready commercial availability and suitable physical form, it is preferred to use polymers produced by emulsion polymerization. Polymer dispersions produced by alternate processes may be used. For example, copolymers may be produced by nonaqueous dispersion polymerization and the organic phase is then replaced with water. These and other polymerization techniques are well known to those skilled in the art and do not constitute the invention.

DRUGS

As aforesaid, the methods of the present invention may be applied to all classes of drugs having acidic and/or basic groups. Where the drug contains a basic nitrogen group, the drug may be used in the invention either as the free amine or as a salt as, for example, a hydrochloride or sulfate.

Basic drugs include, for example, dextroamphetamine, racemic amphetamine, d-desoxyephedrin, chlorpromazine, prochlorperazine, trifluoperazine, methapyrilene, diphenylhydramine, chlorprophenpyridamine, chlorpheniramine, codeine, atropine, reserpine, strychnine, phenylephrine, phenazocine, pilocarpine, morphine, homatropine, ephedrine, dihydrocodeinone, pyrilamine and the like. Amphoteric drugs may also be used and include, for example, penicillins and their salts, cephalosporins and their salts and derivatives. Acidic drugs useful in the invention include, for example, the barbiturates, aspirin, etc.

The great majority of drugs—perhaps as many as 90%—contain basic functionality. Accordingly, the invention will be described in terms of a basic drug and an acidic polymer, but it should be understood that it is equally applicable to a basic polymer with an acidic drug as described above.

REACTION

The choice of a process by which the drug and polymer are contacted to interact to produce the sustained release, delayed release, controlled release or enteric final composition is highly flexible and includes pipeline mixing, countercurrent mixing of opposing fluid streams, jet-stream mixing (i.e., jet stream injection of one liquid phase into the other or a countercurrent stream of the other), tank mixing, or any related fluid mixing operation. Also it has been found that whether such mixing is high shear or low shear, during the drug sorption and trapping process, and whether the rate of admixture of one component with the other is high or low, has little general effect on the sorption and entrapment process. Where maximum drug sorption is desirable, it has been found advisable to add the drug in solution to the polymer emulsion. It is not essential for the drug to be completely soluble in the aqueous phase, but only to furnish a higher concentration of ions than the polymer-drug reaction product. Where the drug is only partly soluble, the ions in solution react with the polymer. As the reaction removes ions from solution, additional drug dissolves until the reaction is complete. The drug and polymer need not be reacted in stoichiometric proportions. Thus an amount of drug over and above that which can react with the polymer may be used. The presence of such a drug fraction in compositions of the present invention, which is physically and mechanically entrapped, i.e., which is not chemisorbed to the polymer, and which is not, in general, involved in the ionic charge dissipation of the polymer emulsion to bring about coagulation of the emulsion, may be utilized to:

(1) Increase the overall rate of drug release, if such physically and mechanically entrappel drug has good solubility properties in the upper gastro-intestinal tract, (2) Decrease the overall rate of drug release from the final composition, if the mechanically entrapped fraction does not have good solubility properties in the upper gastro-intestinal tract, or, (3) Permit use of a drug which is in a form which can only be mechanically entrapped to be combined in this process along with the same or a different drug which can be molecularly trapped, to increase the overall drug concentration of the final composition to above 60%, which is the usual upper limit of drug concentration which can be obtained by molecular scale sorption of drug from a solution, or to a permit useful combinations of drugs, each with its own designed controlled release rate.

The addition of a drug which is not in solution or which cannot go into solution readily in the polymer emulsion or in a solvent which is miscible with the polymer emulsion and which cannot be trapped other than by mechanical means is not usually a primary goal of this invention, since such entrapment would be less uniform and reliable than the main feature of this invention, i.e., molecular to ionic scale drug sorption from solution. However, the combination of molecular scale drug sorption and gross physical scale entrapment may also be employed in the practice of the present invention to produce unique products.

In one preferred embodiment of the invention, the drug is added to a considerable excess of the polymer. Certain drugs must be administered in highly accurate unit doses each containing only a few micrograms of drug. Too little of such a drug in each dose unit might result in failure to treat the disease while an excess of drug over the desired amount may lead to a greater incidence of unwanted side effects or to direct acute toxicity. Also where the difference between an effective dose and a toxic dose is slight extreme precision in formulation is essential. Present techniques of mechanically blending finely ground powders obviously present problems in accurately controlling the level of active ingredient in each unit dose. Variables include the particle size to which the drug has been reduced, the relative particle size distributions of drug and polymer and the uniformity of particle-particle mixing. The present invention permits easy and precise control of drug dispersion and much more uniform drug distribution which is predicated on physico-chemical principles rather than mechanical factors. This is accomplished by contacting an aqueous solution of the drug with a considerable excess of polymer. The drug, being in solution, will be distributed throughout the emulsion as separate molecules or ions which statistically will be randomly distributed throughout the polymer. Thus, instead of dividing one gram of drug into 100,000 approximately equal particles by fine milling, the present invention permits highly uniform distribution of the drug as $6 \times 10^{23}$ molecules/mole throughout the polymer, e.g., at a level of one gram of drug per kilogram of polymer, thus simplifying the problem for the formulator, greatly improving the reliability of mixing, and reducing the mass of dispersed drug by many orders of magnitude. A typical drug with a molecule weight of 300 would produce $2 \times 10^{21}$ molecules or ions for every gram in solution as compared to $1 \times 10^5$ to $1 \times 10^7$ milled particles per gram.

As previously stated, the drug may most commonly be entrapped at a molecular scale level when combined with the polymer emulsion as an aqueous or primarily aqueous solution of the drug salt. However, in some cases, it may be more convenient to combine the drug in its free base or acid nonsalt form with the polymer emulsion, the free base being added as an aqueous solution, organic solvent solution or aqueous dispersion. If the drug base is slightly soluble, as is phenylpropanolamine, the drug as an aqueous solution may be combined with the polymer emulsion. Most cationic drugs in free base form or anionic drugs in acid form are water insoluble, and may be added to the polymer emulsion directly as the oily liquid or insoluble powder free base or acid form, or as a dispersion of the free base or acid in an aqueous media, or as a solution of the free base or acid in an organic solvent which does not interfere with the drug-polymer reaction. As previously described, the most advantageous form of addition is frequently for the drug to be in its maximally disposed form, i.e., in solution.

Since the pH of the most physically stable polymer emulsions containing a polymer with an acidic functional group is prominently acidic, a drug base which is combined with such polymer emulsions will be converted, at least in part, to the drug salt form (ionized species), and will be indistinguishable, as to process result or final composition characteristics, from the process or final composition characteristics of adding the drug salt initially in solution. Of course, it will be appreciated that substantial conversion of the drug base to the ionized species must occur before coagulation of the polymer dispersion is completed.

The aqueous solution or dispersion produced by contacting the drug and polymer as described may be used as such for formulating a pharmaceutical composition, as by adjusting the pH, adding coloring and/or flavoring agents, etc. It is preferred, however, to separate the reaction product from the liquid phase and then formulate the product into a tablet, powder or similar pharmaceutical composition using conventional procedures and compounding ingredients. Where the product is itself insoluble, it may be readily separated by filtration, centrifugation, etc. Other procedures for separating the drug-polymer product involve coagulation as by the addition of a suitable electrolyte or polymer of suitable electric charge, followed by filtration or centrifugation; spray drying; freeze-drying; vacuum evaporation; etc.

The techniques of addition of a non-drug electrolyte to accelerate the coagulation process may be preferably employed either where low quantity levels of drugs are being entrapped (10% or less and usually 2% or less drug in final dry polymer-drug product) which will not in and by themselves reach the requisite flocculation value of the polymer emulsion, or where complete drug sorption is not desirable due to the desire to avoid an excessively retarded drug release. The flocculation value (concentration of ion required to produce visible coagulation following some specified time interval, usually 5 or 10 minutes), for a given ion, varies widely for different anionic or cationic polymer emulsions. Factors involved include intensity of charge on the polymer colloid particles, pH, other additives or stabilizers, temperature, agitation, addition of desolvating solvents and other effects. Likewise the quantity of different drugs required to produce coagulation of a single polymer emulsion varies widely as does the concentration of electrolyte. The first case above, addition of non-drug electrolyte to accelerate coagulation at low quantity levels of drugs, is the usual cause for adding additional non-drug electrolyte. It is noted that polyvalent cations are most effective in coagulating anionic colloids and, when used, will be present in the final composition. Electrolytes such as magnesium sulfate, sodium phosphate and aluminum chloride have been found particularly effective as coagulants in the practice of the present invention. An anionic polymer latex may also be used to coagulate a cationic polymer latex, and a cationic polymer latex to coagulate an anionic polymer latex.

If the coagulated drug-polymer system is not immediately separated from the liquid phase, only an insignificant quantity of the drug will return to the solution, i.e., become desorbed. Thus, where the reaction product was not separated from the aqueous phase for 72 hours, only a negligible quantity of drug was found to return to the aqueous phase.

The drug-sorption interaction rate between certain drugs and polymers of the present invention is rapid, equilibrium being reached within one-half hour or less at room temperature (about 20° C.). Chemisorption thus appears to occur rapidly, with subsequent desorption occurring, under flocculation conditions, very slowly, if at all, depending upon the concentration of drug and polymer.

The polymers of the polymer emulsion systems found useful in the practice of the present invention exhibit hydration, as evidenced by swelling or solubility characteristics, in the physiological pH range of gastrointestinal juices of fluids at normal body temperatures (37° C.). The solubility rate of a typical polymer exhibiting a delayed or sustained release pattern is shown in Table 1.

TABLE 1.—RATE OF SOLUBILITY OF LATEX A

| Total hours immersed | Cumulative percent dissolved | pH of fluid |
| --- | --- | --- |
| 1 | 7.4 | 1.4 |
| 2 | 7.1 | 1.4 |
| 3 | 7.7 | 2.1 |
| 4 | 7.7 | 2.6 |
| 5 | 11.2 | 5.5 |
| 6 | 60.0 | 6.9 |
| 8 | 100.00 | 7.4 |

Latex A is an acrylic copolymer containing about 35% carboxylic acid functionality. It is available from the Rohm and Haas Company under the trademark Acrysol ASE-75. The latex contains 40% solids Temperature also does not appear to have any substantial effects on the sorption process itself. Thus the reaction between Latex A and methapyrilene proceeded with equal effectiveness at 4° and at 25° C. By reason of convenience, the process of the invention would normally be carried out at room temperature. However, where the solubility or stability of the drug is a factor, higher or lower temperatures as from 0° C. to 100° C. may be used as appropriate.

The drug-polymer dispersion system which is obtained from the present sorption process may conveniently be separated from the remaining bulk phase or supernatent liquid by conventional processes as described, followed by drying and milling to a granular or fine, free-flowing powder, which can readily be encapsulated or tabletted in oral dosage form or suspended in a liquid vehicle.

Any convenient drying process may be used to obtain the dry product, whether direct heat, vacuum, spray, or the like. It is noted that drying temperatures which exceed the glass point of the polymer serve to densify the polymer-drug system composition. Such densification may have the effect of retarding drug release by reducing effective total release site surfaces.

The following examples are not to be taken in a limiting sense, but are merely illustrative of the present invention. All reactions are at room temperature.

EXAMPLE I

Methapyrilene hydrochloride—200.0 gm.
Distilled water—1000.0 ml.
Latex A—1250.0 ml.

The methapyrilene hydrochloride is dissolved in the distilled water, and is continuously mixed with the aid of a power stirrer as the latex is slowly added. Immediate flocculation and coagulation of the latex occurs on addition to the drug solution. After addition of the latex is completed, stirring of the resultant slurry is continued for an additional five minutes. The mixture is then vacuum filtered through a coarse sintered glass filter. The collected solid material is placed in flat glass trays and is dried at 50° C. for approximately four hours. The resultant granular dried material is then comminuted or ground to appropriate size (Fitzpatrick Comminutor, with 40 mesh screen and hammers forward), and is then screened to uniform size (screened through 60 mesh screen).

Reproducibility of the entrapment procedure, utilizing the formula and procedure of Example I, is demonstrated in Table II.

TABLE II

| Batch number | Mg. of methapyrilene HCl [1] | Average of two assays |
| --- | --- | --- |
| 1 | 135.28 / 134.59 | 134.94 |
| 2 | 133.05 / 139.11 | 136.08 |
| 3 | 133.94 / 133.87 | 133.91 |
| 4 | 130.99 / 129.77 | 130.38 |
| 5 | 132.95 / 131.69 | 132.32 |
| 6 | 127.22 / 131.98 | 129.60 |

[1] Per gm. of collected solid.

EXAMPLE 2

Ingredients: Amount
  Methapyrilene hydrochloride
    solution _____ 0.1 mM./25 ml.
  Latex A _____ 25 ml.

The drug solution was pipetted into the polymer emulsion over a three to five minute period using a magnetic stirrer to provide agitation. The uncoagulated polymer colloid bearing sorbed drug was then mechanically separated by ultracentrifugation at 30,000 r.p.m. for one hour, and was dried. The resutling product was found to contain 0.08 mm. of drug, reflecting about 80% molecular scale entrapment. Entrapment in this case would not be due to mechanical entrapment since flocculation or coagulation was not involved. This procedure is then repeated and compared to a flocculated sample as shown in Table III.

TABLE III

Effect of flocculation on the entrapment of Methapyrilene [1] by Latex a and entrapment of Methapyrilene without flocculation

| Unflocculated [2]: | Flocculated [3] |
| --- | --- |
| .0732 | .0767 |
| .0732 | .0770 |

[1] A total of .1000 millimole of Methapyrilene hydrochloride added to each sample.
[2] The polymer (Latex A) was separated from the unflocculated polymer emulsion by ultracentrifugation.
[3] The latex was flocculated by the addition of 15 ml. of a 4% (w./v.) solution of potassium chloride.

Amine drug bases, which may exist as water soluble powders or viscous, oil-like liquids, may also be effectively entrapped. Amine bases which are rapidly converted to a water soluble salt by the acidity of the polymer emulsion may be partially or wholly converted to the soluble salt prior to or during coagulation of the polymer emulsion and drug entrapment. Amine bases which exist as viscous liquids may also be dispersed throughout the polymer emulsion with the aid of added surfactant, and immediately entrapped as such, as in the following example.

EXAMPLE 3

Chlorpheniramine base—5.0 ml.
Sodium lauryl sulfate—2.0 gm.
Magnesium sulfate—30.0 gm.
Purified water—200.0 ml.
Latex B [1]—1000.0 ml.

[1] Latex B is an acrylic copolymer containing about 40% carboxylic acid functionality. Latex B has about 28% solids and is available from Rohm and Haas Company under the trademark ACRYSOL ASE-69.

Procedure

Mill the chlorpheniramine base and the sodium lauryl sulfate with Latex B until the dispersion is uniform. Dissolve the MgSO₄ in water, and add to the emulsion system. Separate and dry.

EXAMPLE 4

Acrylic polymer emulsions were used to determine the effect of polymer carboxyl content on the amount of the drug bound to the polymer. The composition of the polymers were almost identical, except that half of the acrylic acid was replaced by its methyl ester in one of the emulsions.

Ten milliliters of 0.1 M methapyrilene hydrochloride solution was added to an equal volume of each polymer with stirring. The polymers flocculated to form a tacky mass. The flocculates were removed on a coarse sintered glass filter and broken into small pieces. The flocculates were then washed four times with 100 ml. of distilled water, placed in petri dishes, and dried in an oven for 24 hours at 70° C.

TABLE IV.—COMPOSITION OF EXPERIMENTAL POLYMERS[1]

| | Latex C | Latex D |
|---|---|---|
| Polymer latex: | | |
| Percent ethyl acrylate | 60 | 60 |
| Percent methyl acrylate | 20 | 0 |
| Percent acrylic acid | 20 | 40 |
| Viscosity, cps | 8 | 73 |
| pH of emulsion | 3.7 | 3.6 |
| Percent solids | 25 | 30 |

[1] The particle size of both polymers was estimated to be in the range of 0.10 to 0.15 micron.

NOTE.—Other components of both emulsions—2½% Tergitol NP-33 (nonylphenol plus 13 moles ethylene oxide); 1% Dupanol ME (sodium lauryl sulfate), and ½% $K_2S_2O_8$.

Aliquots of solutions of approximately 1 gm. of each flocculate of Table IV in 100 ml. of 1 N sodium hydroxide were assayed, using a spectrophotometric method. Flocculates of the same polymers which were prepared by the addition of aluminum chloride, in place of methapyrilene hydrochloride, were also dissolved in 1 N sodium hydroxide. These solutions did not have a differential absorbance, and, therefore, the polymers used in this study did not interfere with the analysis of methapyriline.

Latex C (20% acrylic acid) interacted with 0.1179 millimoles of methapyrilene per gram of the polymer, while 0.2236 millimole of methapyrilene was bound per gram of Latex D (40% acrylic acid). Latex C had 50% as much acrylic acid as Latex D and it entrapped 52% as much methapyrilene. This correlation between the acrylic acid content of the polymer and the extent of methapyrilene interaction with the polymer shows that carboxyl groups are involved in the drug-polymer interactions.

Entrapment of a combination of soluble and insoluble salt forms of a drug provides a further method of controlling drug release rate from the drug-polymer systems. The presence of insoluble or slowly soluble drug reduces the amount of drug initially released, following administration.

EXAMPLE 5

Combination of soluble and insoluble forms of a drug

Chlorpromazine hydrochloride—25 gm.
Chlorpromazine benzoate—25 gm.
Magnesium sulfate—10 gm.
Distilled water—500 ml.
Latex E [1]—800 ml.

[1] Latex E is an acrylic copolymer containing about 70% carboxylic acid functionability and has 20% solids. It is available from the Rohm and Haas Company under the trademark ACRYSOL ASE-108.

Procedure

Dissolve the drug hydrochloride and magnesium sulfate in the water and disperse the insoluble drug benzoate salt in the solution. Slowly add the polymer emulsion with mixing filter or separate the coagulated mass, dry and mill to size.

Polymer emulsions, varying in hydrophilic character or water solubility, may be combined to provide an infinite range of solubility, binding and sorption properties. Polymers of opposite ionic character may be expected to coagulate in the presence of one another. However, anionic or cationic polymer emulsions may be successfully employed with other polymer emulsions of like charge or with non-ionic polymer emulsions.

EXAMPLE 6

Codeine phosphate—50 gm.
Magnesium sulfate—50 gm.
Distilled water—200 ml.
Latex C—1000 ml.
Latex F [1]—1000 ml.

[1] Latex F is an acrylic copolymer containing about 1.3% carboxylic acid functionality and has 45% solids. It is available from Rohm and Haas Company under the trademark RHOPLEX MC-4530.

Procedure

Dissolve the codeine phosphate and the magnesium sulfate in the water, thoroughly mix the two polymer emulsions together and add the mixed emulsions to the drug solution. Mix for fifteen minutes, filter, dry and mill to size.

EXAMPLE 7

Codeine alkaloid—20.0 gm.
Methanol—100.0 ml.
Latex D—1000.0 ml.

Procedure

Dissolve the codeine alkaloid in the methanol, and add the resulting solution to the colloidal dispersion. The organic solvent tends to dehydrate the colloid and bring about its coagulation. 50.0 ml. of 10% MgSO₄ solution or other appropriate electrolyte solution may be added to complete the coagulation process, following the addition of the drug solution. Separate and dry the product and mill to size.

The dialysis release of the polymer-drug entrapment system was investigated to determine whether drug was permanently bound to the polymer. It was first established that the polymer per se did not dialyze through the semi-permeable membrane employed. It was then determined that the methapyrilene hydrochloride did freely dialyze through the semi-permeable membrane. The dialysis release of the polymer-drug entrapment system of Example 1 was then determined, and the drug was observed to be from 87 to 98% available for dialysis.

EXAMPLE 8

The in-vitro release rate of the polymer-drug product of Example 1 was then determined. Six replicate samples were run. The mean values are shown in Table V. There was little variation between the six samples.

TABLE V

| Time (hrs.) | ½ | 1½ | 2½ | 4½ | 6½ | 8 |
|---|---|---|---|---|---|---|
| Mean cumulative percent release | 45.7 | 62.6 | 71.7 | 79.8 | 99.1 | 98.4 |
| pH | 1.3 | 1.3 | 2.3 | 6.7 | 7.3 | 7.3 |

EXAMPLE 9

The effect of the polymer-drug ratio of the entrapment system on the release rate is shown in Table VI. The polymer-drug product is produced as in Example 1 except that the amount of methapyrilene is varied. The products were ground to pass a 60 mesh screen. For each polymer-drug product, sufficient product to contain 100 mg. of drug was placed in a sealed glass container with 60 ml. of artificial gastric juice (without pepsin) prewarmed to 37° C. Throughout the test the containers were kept at 37° C. and were rotated 41 revolutions per minute.

TABLE VI

| Time (hr.) | pH | Cumulative percent release | | | |
|---|---|---|---|---|---|
| | | [1] 13.3 | [1] 19.7 | [1] 28.5 | 33.4 |
| ½ | 1.3 | 45.7 | 60.4 | 60.4 | 74.3 |
| 1½ | 1.3 | 62.6 | 73.2 | 71.8 | 81.3 |
| 2½ | 2.3 | 71.7 | 82.8 | 77.1 | 83.2 |
| 4½ | 6.7 | 79.8 | 87.3 | 82.3 | 88.7 |
| 6½ | 7.3 | 99.1 | 93.1 | 92.0 | 91.7 |
| 8 | 7.3 | 98.4 | 94.7 | 94.3 | 92.6 |

[1] Amount of methapyrilene as a percent of the weight of combined polymer and drug.

EXAMPLE 10

Tabletting of the polymer-drug entrapment system also offers a means of further controlling drug release. Employing a 60 mesh powder of polymer-drug, only the lowest drug concentration tested above provided a release rate within an idealized range. However, tabletting the polymer-drug entrapment systems reduces release rates and provides an additional means for controlling release which is particularly important at higher drug concentrations. This is illustrated in Table VII.

TABLE VII

| | 13.3% drug [1] | | | 33.4% drug [2] | | |
|---|---|---|---|---|---|---|
| Time (hr.) | Control | Tablet, 10% starch | Tablet, no starch | Control | Tablet, 10% starch | Tablet, no starch |
| ½ | 45.7 | 45.5 | 17.2 | 74.3 | 16.1 | 25.3 |
| 1½ | 62.6 | 64.9 | 45.6 | 81.3 | 30.0 | 38.1 |
| 2½ | 71.7 | 73.8 | 59.9 | 83.2 | 40.0 | 51.0 |
| 4½ | 79.8 | 81.8 | 68.1 | 88.7 | 48.3 | 53.8 |
| 6½ | 99.1 | 97.0 | 76.9 | 91.7 | 56.7 | 63.8 |
| 8 | 98.4 | 100.0 | 86.7 | 92.6 | 63.7 | 64.4 |

[1] Tablet hardness, 5.0 kg., tablet weight, 746-753 mg.
[2] Tablet hardness, 9.9 kg., tablet weight, 299-306 mg.

In the above table all tablets were prepared to contain 100 ml. of methapyrilene hydrochloride. The drug-polymer product used passed through a 60 mesh screen. The tablets were prepared from the powder on a Carver press at a setting of 8000 lbs./sq. in. Hardness was measured on a Monsanto Hardness Tester. The test conditions, including fluid use, were the same as in Table VI. Untabletted portions of the powders were used as the controls.

The tablets containing starch and 13.3% drug distintegrated in about 10 minutes and followed the same release pattern as the original powder. The tablets with 13.3% drug but no starch swelled to about twice their original size in from ½ to 1½ hours, but did not distintegrate during the 8 hour test. At about the third or fourth hour of the test, the tablets began to visibly diminish in size as the polymer itself began to dissolve, and at the end of the test were greatly reduced in size.

The tablets containing 33.4% drug, whether with or without starch, followed the pattern of the 13.3% tablets without starch. For complete release within the test period, either a higher starch level or a lower tablet hardness would be needed with these tablets.

EXAMPLE 11

The delayed release of the drug-polymer product of Example 1 was also tested in vivo. Guinea pigs were exposed to a continuous flow of histamine vapor produced by nebulizing a 1:80 solution of histamine diphosphate with 70 mms. of mercury air pressure. Guinea pigs displaying dyspneic reactions in less than 3.5 minutes were considered sensitive. The time needed to display dyspneic reactions was measured in seconds for each animal. All tests on the guinea pigs were run from 24-48 hours of the sensitivity determination. For the test all animals were fasted 16 hours, weighed, then dosed with either free methapyrilene hydrochloride or the product produced as in Example 1 (ground to 60 mesh and containing 13.3% drug) so as to supply 2.5 mg. of drug per kg. of animal weight. The drug and the drug-polymer product were both diluted with granular sucrose for administration, the mixtures being coded so the tester would not know which animals received the free drug. Twenty animals were used, ten with the free drug and ten with the drug-polymer product. Every hour the animals were exposed to histamine vapor as in the sensitivity determination. If no dyspneic reactions were noted in an exposure time equal to twice the time needed in the sensitivity test for that animal, the animal was considered to be protected. When measured in this manner, the average protection time for the animals receiving the free drug was 3.8 hours and 8.7 hours for the animals receiving the polymer-drug product. Thus, the protection time to histamine vapor more than doubled using the polymer-drug product of the invention.

EXAMPLE 12

In addition to controlling the duration or intensity of drug action, modifications of drug release may also be used to modify the acute toxicity properties of a drug.

An oral dose of 200 mg./kg. of free methapyrilene hydrochloride was found to kill five out of six rats within 30 minutes after administration of the drug. The rats died in an acute convulsive state. Four out of the five rats were dead within 5 minutes of dosing, illustrating the rapid absorption and onset of action of this drug. One of the six rats survived the preselected 24 hours cut-off point.

The same dose (200 mg./kg.) of methapyrilene hydrochloride administered in a polymer-drug entrapment compound had no lethal effect on six rats, when observed over the 24 hour period. The same entrapment compound administered to the guinea pigs in the histamine vapor study was used for the toxicity study. The results of this acute toxicity study show that the polymer-drug entrapment compound limits the amount of the methapyrilene hydrochloride released immediately and is protracting its availability over an extended period of time.

An additional feature and major area of application of the controlled drug availability possible from the polymer-drug products described herein is the improved safety, reduced overdosage hazard and reduced toxicity of such products, in comparison to conventional drug or drug products which provide rapid, uncontrolled release. An illustration of the reduced acute toxicity hazard of a polymer-drug system was described in the above example. While acute toxicity was reduced it is important to point out that the methapyrilene polymer product did retain effective drug activity as indicated by the protection to histamine vapor in Example 11.

It will, therefore, be appreciated that, depending on the comonomer composition of the polymer emulsion and its functionality, particularly its pendant carboxyl content and presence of other readily hydrated groups, the nature of the drug, and its concentration in the final polymer-drug system product, together with other readily controllable physicochemical factors, products and dosage forms may be produced with the present invention containing molecularly sorbed, trapped and dispersed drug for any of the following purposes:

(1) Provision of true sustained release of the drug displaying a smooth eight hour or longer release pattern which yields therapeutic activity times of 8 to 12 hours, with reduced toxicity, (2) Provision of delayed or enteric drug release, with little to no drug released in the stomach and the remaining drug released in the intestinal tract, (3) Masking of objectionable tasting drugs, reduction of objectionable drug odors, prevention of numbing or other local drug effects on oral mucosa, and reduction or elimination of nausea caused by drugs irritating to the stomach, (4) Reduction or prevention of physical and/or chemical incompatibilities between drugs or other chemicals by the effective molecular scale entrapment of one of the reactants.

(5) Reduction of drug toxicity properties and improvement of drug safety.

(6) Preparation of highly uniform dispersions of minute quantities of drug based on the molecular to ionic scale of distribution and mixability.

From the foregoing it will be appreciated that it has been discovered that the number of chemisorption sites on certain polymers, or polymer emulsions, the presence of other coagulating electrolyte in the drug solution (especially polyvalent cations), are variables which may either promote or hinder drug sorption to the polymer colloid, influencing and controlling both the entrapment of the drug and its subsequent dissolution and release from the drug-polymer system. Such control is a highly advantageous feature of the invention since it permits the design of products to release drug or other types of materials very slowly, rapidly initially plus continuously with a slower release fraction, or at an intermediate rate, according to the purpose of the intended final product. The aforementioned variables controlling entrapment and release are physical or chemical in nature and in their mechanism of action on the process, and may be precisely controlled. Other factors such as temperature, rate of mixing during polymer-drug combination, length of time lapse between interaction and separation of coagulated polymer, have not been found to have a substantial effect on the results or uniformity of the results. This is a clear-cut and demonstrated advantage over known pharmaceutical coating methods as well as over other more analytical known approaches to drug and chemical inclusion entrapment or binding.

The process described herein is superior to other chemisorption processes, such as ion exchange, in that the polymer in this process is in a maximum state of dispersion, fine particle size, maximum surface and high concentration, and the resulting entrapment process is consequently much more rapid, reliable and efficient.

The process of this invention is unlike simple ion exchange in that it involves both sorption and entrapment, the latter resulting from the coagulation process. The polymers used by this process are unlike those commonly used in pure chemisorption methods, such as ion exchange, in that the polymers are soluble or are hydrated at physiological pH's. Since the polymers employed by the process are not inert under gastro-intestinal conditions, more complete drug release is assured than when inert polymers depending on drug leach-out for release are employed.

Although minor modifications and alterations of the present invention will become readily apparent to those versed in the art, it should be understood that what is intended to be encompassed within the scope of the patent warranted hereon are all such embodiments as reasonably and properly come within the scope of the contribution to the art hereby made.

What is claimed is:

1. A method for the preparation of a pharmaceutical composition which comprises the steps of:
 (a) providing an aqueous latex of dispersed particles of at least one physiologically harmless member selected from the group consisting of polymers having acidic functionality, polymers having basic functionality, and polymers having both acidic and basic functionality, said selected member being hydratable in the gastro-intestinal tract, said polymer being a pre-formed product of emulsion polymerization;
 (b) providing a dispersion of a pharmaceutically active drug, said drug being at least partially soluble in the dispersing medium and having functionality reactive with functionality of said polymer with the proviso that if the polymer contains only acidic groups, the drug must contain basic groups and if the polymer contains only basic groups, the drug must contain acidic groups, said dispersing medium being compatible with said aqueous latex;
 (c) intermixing said latex and said drug dispersion to effect absorption of said drug to said polymer particles;
 (d) separating the particulate sorption product of step (c); and
 (e) formulating said sorption product into an oral dose form.

2. A method in accordance with claim 1 wherein the amount of said drug dispersion intermixed in step (c) is sufficient to coagulate said latex, and step (d) comprises separation of supernatant from the coagulated latex.

3. A method in accordance with claim 1 wherein the amount of said drug dispersion intermixed in step (d) is insufficient to coagulate said latex, and step (d) comprises addition of a coagulating amount of an electrolyte and separation of supernatent from the coagulated latex.

4. A method in accordance with claim 1 wherein the amount of said drug dispersion intermixed with said latex is insufficent to coagulate said latex and the sorption product is separated by mechanical means.

5. A method in accordance with claim 1 wherein said polymer is an acrylic polymer of acrylic acid, methacrylic acid or combinations thereof.

6. A pharmaceutical composition in oral dosage form characterized by controlled release prepared in accordance with the process of claim 1 comprising a pharmaceutically active acidic or basic drug or a drug that is both acidic and basic chemisorbed on the molecular-to-ionic scale in an aqueous dispersing medium in which said drug is at least partially soluble to latex particles of a physiologically harmless basic or acidic polymer or a polymer that is both acidic and basic that is hydratable in the gastro-intestinal tract, said polymer being a pre-formed product of emulsion polymerization and sufficiently functionally reactive to chemisorb said drug on the molecular-to-ionic scale whereby the major portion of the drug is available for dialysis and only a minor portion of the drug is permanently bound by the polymer and is unavailable for gastro-intestinal absorption, with the proviso that if the polymer contains only acidic groups, the drug must contain basic groups and if the polymer contains only basic groups, the drug must contain acidic groups.

7. A composition in accordance with claim 6 wherein said polymer is an acidic polymer and said drug is a basic drug.

8. A composition in accordance with claim 7 wherein said polymer is the product of emulsion polymerizing (a) at least one member selected from the group consisting of acrylic acid, methacrylic acid, crotonic acid, itaconic acid, maleic acid, half-esters of maleic acid, maleic anhydride, sulfonated styrene, and phosphonated styrene with (b) at least one member selected from the group consisting of vinyl acetate, vinyl propionate, vinyl ethers, hydroxyethyl methacrylate, acrylonitrile, ethylene, styrene, vinyl chloride, lower alkyl acrylates, and lower alkyl methacrylates.

9. A composition in accordance with claim 7 wherein said drug contains a basic nitrogen group.

10. A composition in accordance with claim 8 wherein said drug contains a basic nitrogen group.

11. A composition in accordance with claim 8 wherein the group (a) selection is methacrylic acid, acrylic acid, or a combination thereof, and said polymer is essentially acrylic.

12. A composition in accordance with claim 11 wherein said drug contains a basic nitrogen group.

13. A composition in accordance with claim 6 in liquid suspension dosage form.

14. A composition in accordance with claim 6 in solid dosage form.

References Cited
UNITED STATES PATENTS

| | | | |
|---|---|---|---|
| 2,906,665 | 9/1959 | Doyle | 424—180 X |
| 2,990,332 | 6/1961 | Keating | 424—79 |
| 3,066,075 | 11/1962 | Deutsch | 424—180 X |
| 3,121,043 | 2/1964 | Tobin et al. | 424—81 X |
| 3,158,538 | 11/1964 | Lee | 424—79 |
| 3,214,341 | 10/1965 | Feinstone | 424—362 |
| 3,328,256 | 6/1967 | Gaunt | 424—19 |
| 3,346,449 | 10/1967 | Magid | 424—81 |
| 3,449,489 | 6/1969 | Gaunt | 424—31 |

SHEP K. ROSE, Primary Examiner

U.S. Cl. X.R.

424—19, 32, 33, 48, 81